(12) United States Patent
Katan Baf Nezhad et al.

(10) Patent No.: US 11,503,545 B2
(45) Date of Patent: Nov. 15, 2022

(54) WAKEUP MESSAGING FOR BACKSCATTER COMMUNICATION SYSTEM NODE

(71) Applicant: Robert Bosch GmbH, Stuttgart (DE)

(72) Inventors: Mohamadtaghi Katan Baf Nezhad, Seattle, WA (US); Vivek Jain, Sunnyvale, CA (US)

(73) Assignee: ROBERT BOSCH GMBH

( * ) Notice: Subject to any disclaimer, the term of this patent is extended or adjusted under 35 U.S.C. 154(b) by 175 days.

(21) Appl. No.: 16/888,109

(22) Filed: May 29, 2020

(65) Prior Publication Data

US 2021/0377859 A1 Dec. 2, 2021

(51) Int. Cl.
H04W 52/02 (2009.01)
H04W 4/80 (2018.01)
H04B 5/00 (2006.01)
H02J 50/00 (2016.01)

(52) U.S. Cl.
CPC ....... H04W 52/0229 (2013.01); H02J 50/001 (2020.01)

(58) Field of Classification Search
CPC ... H04W 52/0229; H04W 4/80; H04W 28/18; H02J 50/001; H04B 5/0031; H04B 5/0025; H04B 1/40; H04B 5/02
See application file for complete search history.

(56) References Cited

U.S. PATENT DOCUMENTS 10,498,569 B2 12/2019 Ganesan et al.
2014/0062672 A1* 3/2014 Gudan ............... G06K 19/0715
340/10.33
2018/0375703 A1 12/2018 Kellogg et al.

OTHER PUBLICATIONS

Katanbaf et al., "Relacks: Reliable Backscatter Communication in Indoor Environments", Proc. ACM Interact. Mob. Wearable Ubiquitous Technol., vol. 4, No. 2, Article 48. Publication date: Jun. 2020, 24 pages.

* cited by examiner

*Primary Examiner* — Philip Sobutka
(74) *Attorney, Agent, or Firm* — Dickinson Wright PLLC

(57) ABSTRACT

Embodiments of a backscatter communication system and methods of using the system are disclosed. The system may comprise a backscatter node, comprising: an antenna circuit; and a wake-up circuit coupled to the antenna circuit. The wake-up circuit may be configured to, using pattern correlation, identify at least one predefined waveform within a radio frequency signal and in response to the identification, enable a receiver circuit.

18 Claims, 7 Drawing Sheets

WAKEUP MESSAGING FOR BACKSCATTER COMMUNICATION SYSTEM NODE

TECHNICAL FIELD

The present disclosure relates generally to backscatter communication.

BACKGROUND

A backscatter device, such as an RF identification (RFID) tag, reflects radio frequency (RF) signals of a transmitter. Backscatter devices may reflect received RF signals, even though the backscatter device was not the intended target. Backscatter devices are susceptible to link failures such as not reflecting RF signals that are weak.

SUMMARY

According to another embodiment, a backscatter communication system is disclosed. The system may comprise a backscatter node, comprising: an antenna circuit; and a wake-up circuit coupled to the antenna circuit, the wake-up circuit comprising: an envelope detection circuit coupled to the antenna circuit, the envelope detection circuit optionally may extract a message signal from an RF signal received from a transmitter; a pattern correlation circuit coupled to the envelope detection circuit; and a receiver circuit coupled to the pattern correlation circuit and configured to receive message data from the RF signal (e.g., a message signal), wherein the pattern correlation circuit is configured to identify at least one predefined waveform within the RF signal and in response to the identification, enable the receiver circuit.

According to another embodiment, a method is disclosed that may comprise: receiving, at a backscatter node, a radio frequency (RF) signal that comprises a wake-up message from a transmitter or a receiver; and in response to receiving the wake-up message, changing from a low power mode to an active mode, wherein the wake-up message comprises a predefined waveform.

According to another embodiment, a non-transitory computer-readable medium is disclosed. The medium may comprise a plurality of instructions stored thereon, the plurality of instructions comprising to: receive, at a backscatter node, a radio frequency (RF) signal that comprises a wake-up message from a transmitter or a receiver; and in response to receiving the wake-up message, change from a low power mode to an active mode, wherein the wake-up message comprises a predefined waveform.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
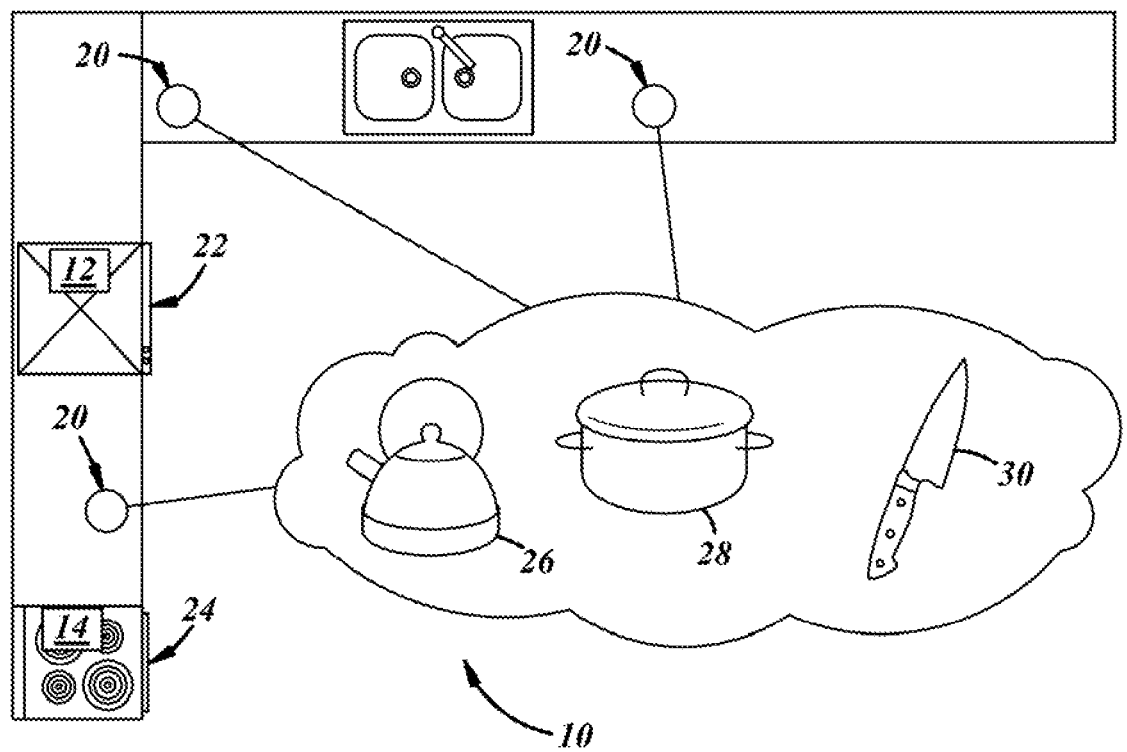
FIG. 1 is a schematic diagram illustrating an example environment of a backscatter communication system that comprises a transmitter, a receiver, and at least one backscatter node.

Turning now to FIG. 1—wherein like reference numerals indicate like or similar functions or features, a backscatter communication system 10 is shown that comprises a transmitter 12, a receiver 14, and one or more backscatter nodes 20 (hereafter, 'nodes' and several are shown here by way of example). System 10 may improve a user's experience by permitting a variety of utensils and devices to communicate—e.g., a user (not shown) can be notified that an item cooking on a stove may be reaching a predefined temperature or notifying the user of a duration that the contents on the stove are at a predetermined temperature or have completed a predetermined temperature profile. This may minimize overheating or overcooking a food dish. As will be explained in greater detail below, the transmitter 12 may transmit wirelessly a radio frequency (RF) signal carrying a message to the receiver 14, and using the signal, the nodes 20 at utensils and devices may report data that is unique to the utensil/device to the receiver 14. Upon receipt at the node(s) 20, the respective node 20 may determine whether to wake up (e.g., from a low power mode to an active mode) based upon characteristics of the RF signal—e.g., including a presence of a predefined waveform with the RF signal (e.g., a pattern within the RF signal indicating that the RF signal is relevant to the node 20). In some examples, the node 20 may switch to the active mode regardless of whether the RF signal is relatively weak or relatively strong. Further, when the node 20 wakes-up, node 20 may use a plurality of link parameters to wirelessly communicate with the receiver 14 (e.g., using energy of the RF signal sent by transmitter 12). The system 10 may execute one or more policies that statistically determine and optimize which set of link parameters the system 10 uses. This optimization may improve a likelihood of communication success (e.g., between the transmitter 12 and the node 20 and/or between node 20 and receiver 14). Other novel aspects of the backscatter communication system 10 will be described below as well.

According to the illustrated (kitchen) example, transmitter 12 may form part of electronics of a dishwasher appliance 22, receiver 14 may form part of electronics of an oven appliance 24, and the nodes 20 may form part of a tea kettle 26, a cookpot 28, a kitchen knife 30, or other suitable kitchen tool or utensil. Here, the dishwasher and oven appliances 22, 24 may be coupled to a residential, commercial, industrial, etc. alternating current (AC) power source—e.g., such as a wall outlet (not shown), whereas tea kettle 26, cookpot 28, and knife 30 may not utilize AC power. While some nodes 20 may use direct current (DC) battery power (none such are shown), other nodes 20 such as the tea kettle 26, cookpot 28, and knife 30 may be functional without electrical power. Further, while this example describes transmitter 12 and receiver 14 connected to AC power, they may instead be coupled to DC battery power or the like. In this example, system 10 is embodied as an Internet of Things (IoT) connected kitchen, but as will be apparent from the description below, this is merely an example; other embodiments are possible (and a few additional non-limiting implementations are set forth below).

Figure 2:
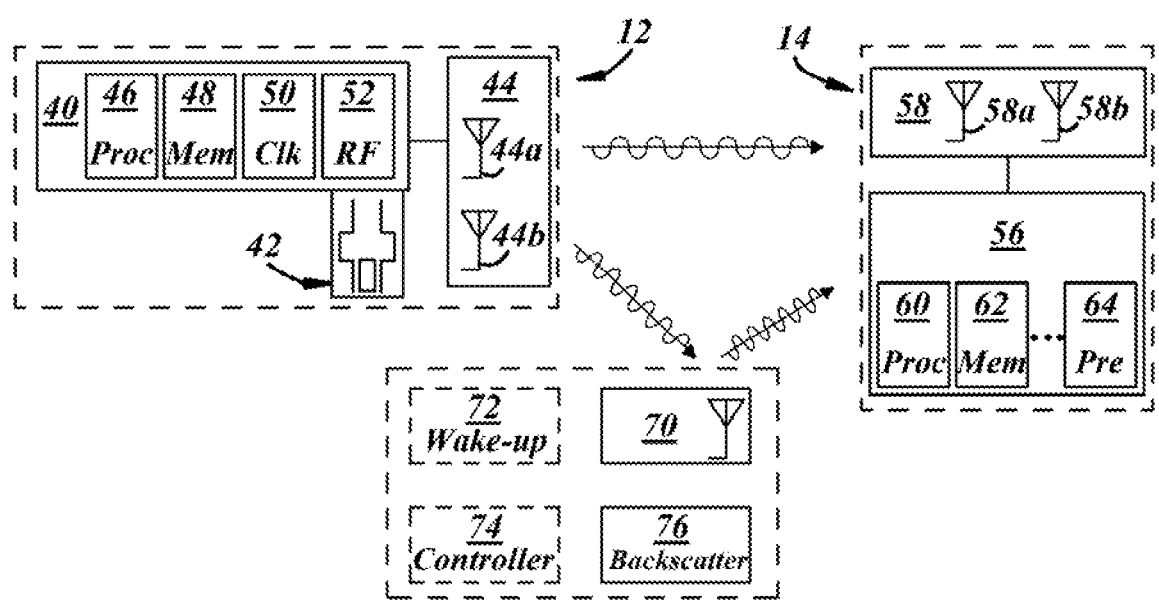
FIG. 2 is an electronic schematic diagram illustrating an example of the transmitter, the receiver, and one backscatter node.

As shown schematically in FIG. 2, transmitter 12 may be a short-range wireless communication (SRWC) transmitter and may comprise a transmission circuit 40, an oscillator 42, and an antenna circuit 44. SRWC may refer to wireless communication ranges less than 150 meters (m); in other examples, SRWC may refer to wireless communication ranges less than 500 m or even less than 1000 m; in other examples, SRWC may refer to wireless communication ranges less than 5000 m. Transmission circuit 40 may comprise, among other things, a processor 46, memory 48, a clock 50, and a radio frequency (RF) circuit 52.

Processor 46 may be any suitable device that controls wireless transmission of transmitter 12. Processor 46 may be programmed to process and/or execute digital instructions to carry out at least some of the tasks described herein. Non-limiting examples of processor 46 include one or more of: a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc. just to name a few. In at least one example, processor 46 reads from memory 48 and/or and execute multiple sets of instructions which may be embodied as a computer program product stored on a non-transitory computer-readable storage medium (e.g., such as memory 48). Executable instructions may pertain to controlling transmission, maintaining compliance with a predetermined wireless protocol, sending data over an RF transmission signal, packaging data within a carrier signal, transmitting a pre-defined waveform that may be recognizable by node 20, or the like. Some non-limiting examples of instructions are described in the process(es) below and illustrated in the drawings. These and other instructions may be executed in any suitable sequence unless otherwise stated. The instructions and the example processes described below are merely embodiments and are not intended to be limiting.

Memory 48 may comprise volatile and/or non-volatile memory devices. Non-volatile memory devices may comprise any non-transitory computer-usable or computer-readable medium, storage device, storage article, or the like that comprises persistent memory (e.g., not volatile). Non-limiting examples of non-volatile memory devices include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory devices may store one or more sets of instructions which may be embodied as software, firmware, or other suitable programming instructions executable by processor 46—including but not limited to the instruction examples set forth herein.

Volatile memory devices may comprise any non-transitory computer-usable or computer-readable medium, storage device, storage article, or the like that comprises nonpersistent memory (e.g., it may require power to maintain stored information). Non-limiting examples of volatile memory include: general-purpose random-access memory (RAM), static RAM (SRAM), dynamic RAM (DRAM), or the like.

Clock 50 may comprise any suitable device that maintains a clock signal. E.g., according to a non-limiting example, clock 50 may provide a 48 megahertz (MHz) signal; of course, other examples are possible.

RF circuit 52 may include any suitable amplifiers, filters, antennas, etc. that enable transmission. Further, as controlled by the processor(s), the RF circuit 52 may mix a carrier signal and a message signal (resulting in an RF signal), amplify the RF signal, and provide this RF signal to antenna circuit 44 for transmission.

Oscillator 42 may comprise any suitable crystal for frequency generation. E.g., according to a non-limiting example, oscillator 50 may be a 24 MHz quartz crystal; of course, other examples are possible.

Antenna circuit 44 may comprise one or more antennas suitable for transmission and one or more desired frequencies. According to at least one example, the antenna circuit comprises at least two antennas (e.g., a first antenna 44a and a second antenna 44b). In at least one example, first antenna 44a is oriented in two of three planes (e.g., an X-Z plane), whereas second antenna 44b is oriented in two different planes (e.g., Y-Z plane). Further, antennas 44a, 44b may be spaced from one another as well (e.g., both part of transmitter 12 but within a few centimeters (cm) from one another). Having antennas with different orientations may improve backscatter communication (e.g., a success rate thereof, as discussed below). It should be appreciated that RF circuit 52, oscillator 42, and antenna circuit 44 may be coordinated and arranged to utilize any desirable wireless protocol(s). According to one non-limiting example, transmitter 12 is configured to utilize one or more of the following: a Bluetooth Low Energy (BLE) protocol, a Zigbee protocol, a Z-wave protocol, a Thread protocol, a Wi-Fi protocol, etc. Other configurations and/or protocols may be used instead.

Figure 8:
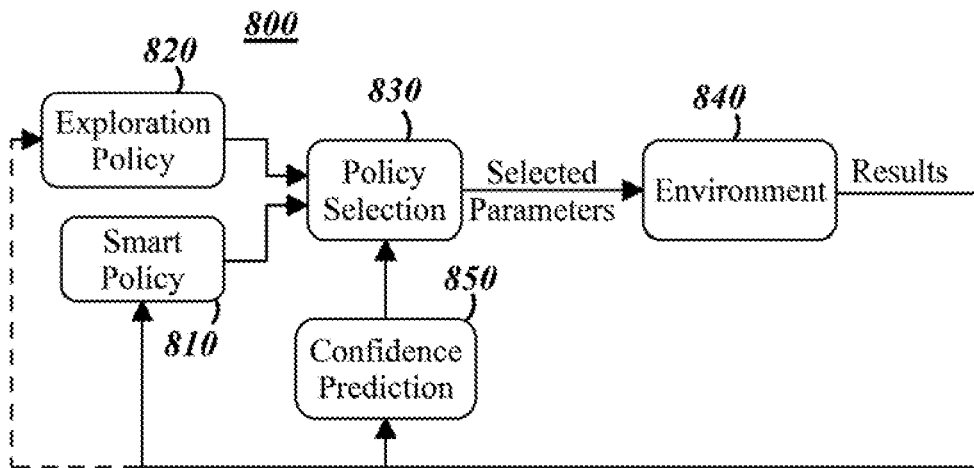
FIG. 8 is a flow diagram illustrating a process of using a smart policy and an exploration policy.
Figure 9:
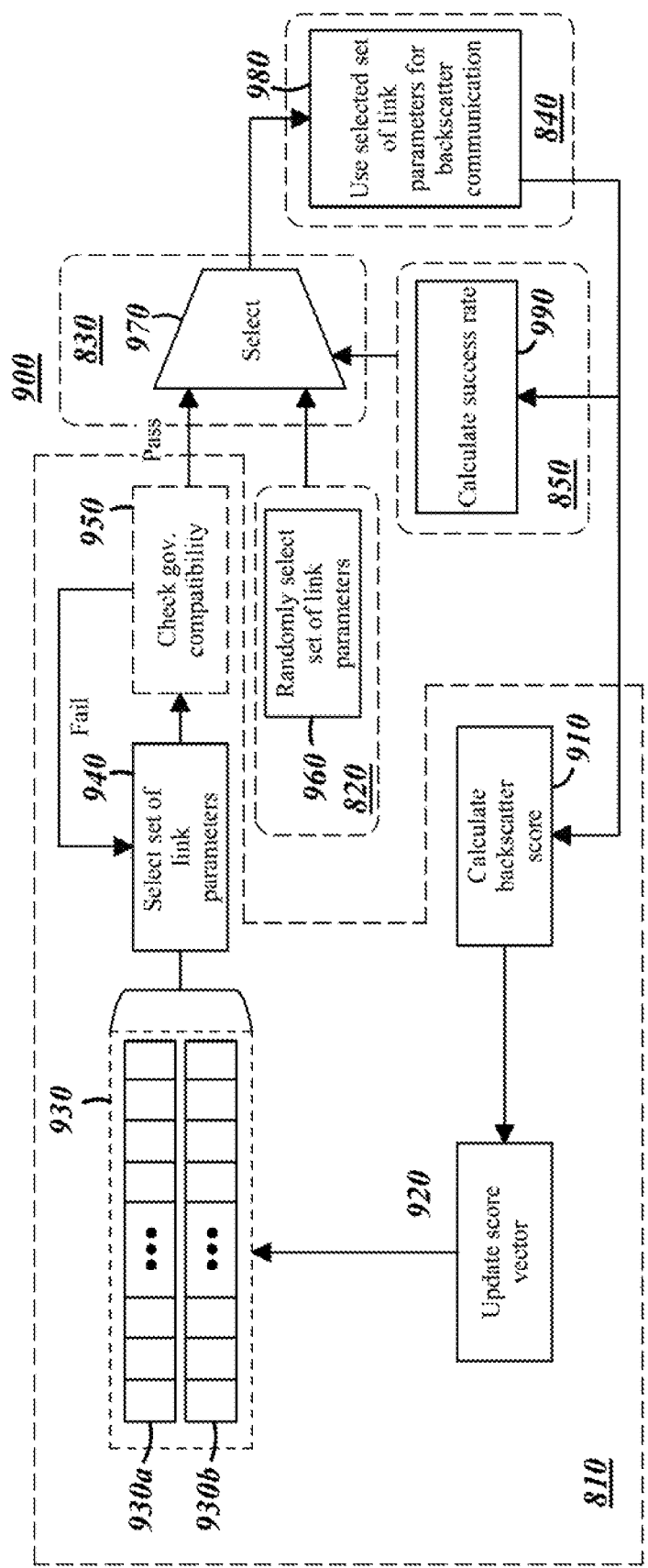
FIG. 9 is a flow diagram illustrating an embodiment of the process shown in FIG. 8.

FIG. 2 also illustrates receiver 14. Receiver 14 may be an SRWC receiver and may comprise, among other things, a receiver circuit 56 and an antenna circuit 58. Receiver circuit 56 may comprise any suitable hardware components such as a processor 60, memory 62, a pre-amplifier circuit 64 (that comprises filters, operational-amplifiers, etc.), and/or the like. Hardware of processor 60 may be similar or identical to processor 46; however, in some examples, processor 60 may execute some instructions that are different from those executed by processor 46. Similarly, memory 62 may be similar or identical to memory 48; however, memory 62 may store at least some different instructions to be executed by processor 60. For example, memory 62 may store one or more of a smart policy (that facilitates selection of a set of link parameters for a backscatter communication) or an exploration policy that uses random sets of link parameters to improve a likelihood of successful communication, and processor 60 may execute one or more instructions to carry out these policies. Examples of policy implementation are shown in FIGS. 8-9 and will be discussed in greater detail in the illustrative processes discussed below.

Antenna circuit 58 may comprise one or more antennas matched to receive the RF signal from transmitter 12. According to at least one example, the antenna circuit 58 comprises at least two antennas (e.g., a first antenna 58a and a second antenna 58b). Similar to the example set forth above (e.g., with respect to the transmitter 12), first antenna 58a may be oriented in two of three planes (e.g., an X-Z plane), whereas second antenna 58ba may be oriented in two different planes (e.g., Y-Z plane). Further, as described above, antennas 58a, 58b may be spaced from one another as well (e.g., within a few cm from one another).

In FIGS. 1-2, the transmitter 12 and receiver 14 are shown as separate devices—e.g., wherein receiver 14 is located in a device (e.g., oven appliance 24) different from transmitter 12 (e.g., dishwasher appliance 22). In other examples, receiver 14 and transmitter 12 are located in the same device (e.g., both in dishwasher appliance 22, or both in oven appliance 24—e.g., configured as a transceiver). In at least one example, transmitter 12 is a transceiver (e.g., both transmitter and receiver) and/or receiver 14 is a transceiver (e.g., both transmitter and receiver). Thus, in at least some examples, transmitter 12 may operate in a transmitting mode and/or a receiving mode. Similarly, in at least some examples, receiver 14 may operate in a transmitting mode and/or a receiving mode.

Figure 3:
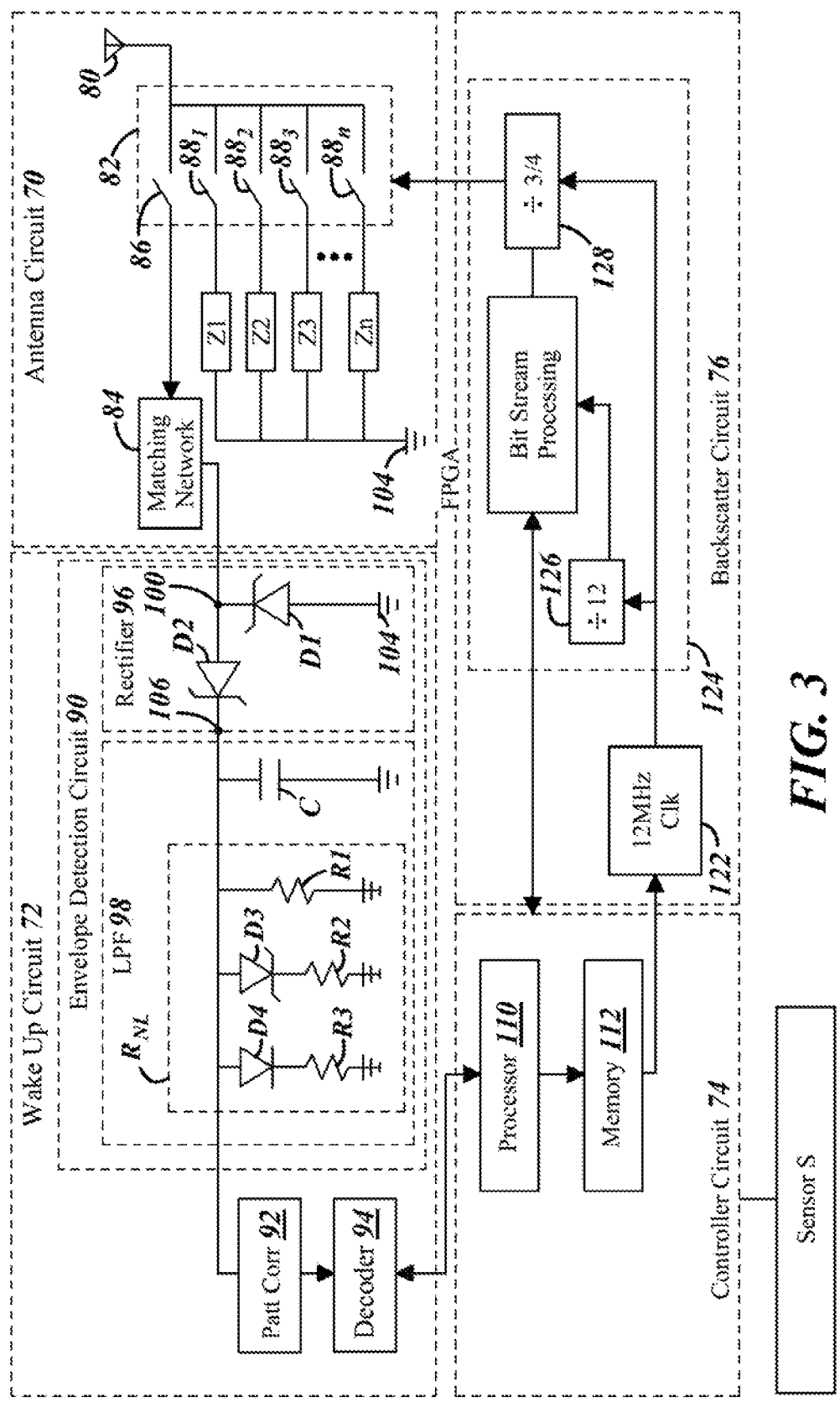
FIG. 3 is an electronic schematic diagram illustrating an example of the backscatter node comprising an antenna circuit, a wake-up circuit, a controller circuit, and a backscatter circuit.

FIGS. 2-3 illustrate an illustrative example of backscatter node 20. Backscatter node 20 may comprise, among other things, an antenna circuit 70, a wake-up circuit 72, a controller circuit 74, and a backscatter circuit 76. Not all of circuits 70-76 are required; e.g., in other embodiments, various combinations of two or more of circuits 70-76 may be employed. The illustrations are merely one example of hardware and arrangements that may be used; other equivalent hardware may be employed in other examples.

Antenna circuit 70 may comprise one or more antennas 80 (in one example, circuit 70 comprises one antenna), a switching circuit 82, and a matching network 84. Antenna(s) 80 may be suited to the desired frequencies to be used and may be arranged according to any suitable configuration. It should be appreciated that the device which carries node 20 may be portable, and a user may change its position (e.g., within the kitchen) and/or its relative orientation with respect to the antennas 44a, 44b of the transmitter 12 and/or the antennas 58a, 58b of the receiver 14. Hence, it is anticipated that antenna 80 may have better reception of an RF signal depending on which of antennas 44a, 44b are used in transmission, and subsequently, a backscatter communication from node 20 may be received with higher quality depending on which of antennas 58a, 58b are used in reception, as explained more below.

According to one example, switching circuit 82 may comprise a first switch 86 coupled between antenna 80 and the matching network 84, and a plurality of impedance-matching switches $88_1$, $88_2$, $88_3$, $88_n$ coupled between antenna 80 and corresponding impedance values (e.g., $Z_1$, $Z_2$, $Z_3$, . . . , $Z_n$), wherein impedance values ($Z_1$, $Z_2$, $Z_3$, . . . , $Z_n$) are coupled between the impedance-matching switches $88_1$-$88_n$ and ground 104 (wherein 'n' may be any suitable quantity). Further, impedance values ($Z_1$, $Z_2$, $Z_3$, . . . , $Z_n$) may be any suitable values. As described below, switching circuit 82 may be controlled by backscatter circuit 76.

Matching network 84 may be any suitable electronic hardware that enables proper matching by transforming an impedance relationship between a source (e.g., the RF signal of transmitter 12) and a load (e.g., the remaining circuits 72-76). E.g., it may be designed to transfer substantially all power to the load while presenting an input impedance that is equal to the complex conjugate of the source's output impedance (e.g., the output impedance of antenna circuit 44). Other aspects of matching network are known in the art. Matching network may be coupled between the wake-up circuit 72 and the first switch 86.

Figure 4:
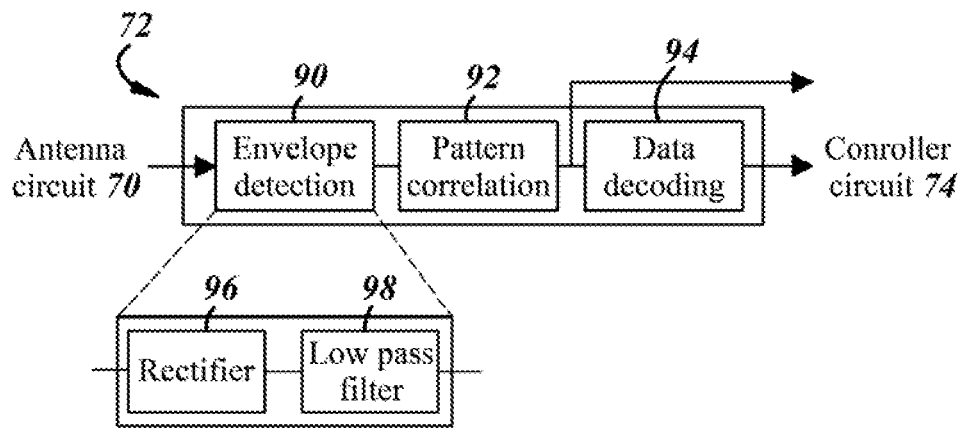
FIG. 4 illustrates a functional block diagram of a non-limiting example of the wake-up circuit.

Wake-up circuit 72 may comprise an envelope detection circuit 90 coupled to a pattern correlation circuit 92 and a data decoder circuit 94, wherein the pattern correlation circuit 92 is coupled between the envelope detection circuit 90 and the data decoder circuit 94. FIG. 4 illustrates a functional block diagram of a non-limiting example of wake-up circuit 72, wherein an RF signal from the antenna circuit 70 is fed through the envelope detection circuit 90, the pattern correlation circuit 92, and the data decoder circuit 94 and thereafter on to the controller circuit 74. FIGS. 3 and 4 illustrate that envelope detection circuit 90 may comprise a rectifier 96 coupled to a low pass filter 98 (FIGS. 3-4). Envelope detection circuit 90 may be configured to extract a message signal (e.g., a high-frequency signal) from a transmission from the transmitter 12 (e.g., from the RF signal).

A non-limiting example of rectifier 96 is shown. Here, rectifier 96 may comprise a first node 100 (coupled to matching network 84), a first (Zener) diode D1 coupled between ground 104 and the first node 100, a second node 106, and a second (Zener) diode D2 coupled between the first and second nodes 100, 106. Other rectifier arrangements (having any suitable components) are also possible.

Low pass filter (LPF) 98 may comprise an accumulating capacitor C coupled between the second node 106 and ground 104 and a nonlinear resistor $R_{NL}$ coupled between the second node 106 and ground 104. Nonlinear resistor $R_{NL}$ may comprise a resistor R1 coupled between second node 106 and ground 104 and one or more diode-resistor pairs (D3-R2 and D4-R3) each coupled between the second node 106 and ground 104. E.g., in FIG. 3, two diode-resistor pairs are shown between second node 106 and ground, wherein each diode-resistor pair comprises a diode in series with a resistor (e.g., D3 in series with R2 and D4 in series with R3). The values of the capacitor C, resistors R1, R2, R3, and diodes D3, D4 may be selected so that a corner frequency is proportional to an input signal level (e.g., at second node 106). The LPF 98 above is merely an example, and other arrangements (including other nonlinear resistor arrangements) may be used instead.

In operation, the envelope detection circuit 90 may extract a desired high-frequency signal from the RF signal. In the presence of an RF signal, capacitor C is charged (and voltage at second node 106 rises), and in an absence of the RF signal, the charge of capacitor C is discharged. Envelope detection circuit 90 may extract the desired high-frequency signal regardless of whether the RF signal is greater than a first predetermined threshold or the RF signal less than a second predetermined threshold. It should be appreciated that if a linear resistor were used instead of nonlinear resistor $R_{NL}$, during strong RF signals, the linear resistor would need to be relatively small (e.g., small enough to discharge capacitor C within a discharge cycle; e.g., which may be as little as 4 μs), and during weak RF signals, the linear resistor would need to be relatively large (e.g., large enough to permit the voltage at second node 106 to rise during a charge cycle; e.g., which also may be as little as 4 μs). Accordingly, nonlinear resistor $R_{NL}$ may be used instead of a single linear resistor and capacitor C in parallel. And the illustrated implementation is insensitive to whether the RF signal is relatively weak or relatively strong- and is operational in both scenarios and therebetween.

Pattern correlation circuit 92 may comprise circuit electronics that parse incoming signal data for preamble bits and a data pattern (e.g., a bit sequence). According to one example, pattern correlation circuit 92 may provide an enable signal to the data decoder circuit 94 and/or controller circuit 74 when the data pattern is identified and when a timing match is determined (e.g., a duration of a single bit matches a predetermined duration). According to a couple non-limiting examples, a wake-up protocol may comprise a single pattern detection (e.g., a 16-bit pattern or a 32-bit pattern) or a double pattern detection (e.g., a 16-bit pattern or a 32-bit pattern).

Data decoder circuit 94 may be any circuit electronics configured to decode the extracted signal. A Manchester decoder may be employed; however, other examples also may be used. Output of the data decoder circuit 94 may be provided to the controller circuit 74. Austriamicrosystems AS3933 receiver employs a non-limiting example of the pattern correlation and data decoder circuits 92, 94; however, other examples can be used instead.

Controller circuit 74 may comprise a processor 110 and memory 112. Hardware of processor 110 may be similar or identical to processor 46; however, processor 110 may execute different instructions. Similarly, memory 112 may be similar or identical to memory 48; however, memory 112 may store different instructions which are executable by processor. For example, controller circuit 74 may actuate (e.g., enable) backscatter circuit 76 when wake-up circuit 72 determines that an RF signal comprises a signal pattern that indicates that backscatter node 20 should change from a low power mode to an active mode (e.g., as described below, this pattern may comprise a predefined waveform).

In at least one example, controller circuit 74 may be coupled to a sensor S. Sensor S may provide data relative to a device to which backscatter node 20 is coupled. For example, continuing with the example shown in FIG. 1, sensor S may be a temperature sensor, a pressure sensor, or other data sensor which provides information about the tea kettle 26, the cookpot 28, or the knife 30. As discussed below, backscatter node 20 may send a backscatter transmission that comprises this sensor data.

Figure 5:
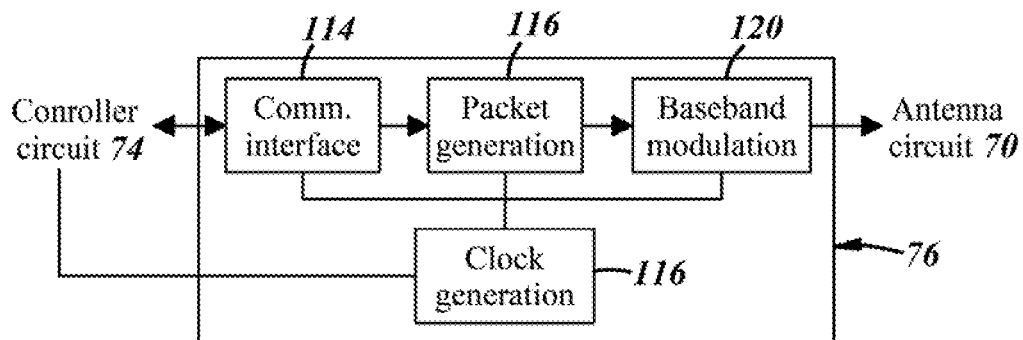
FIG. 5 illustrates a functional block diagram of a non-limiting example of the backscatter circuit.

Turning now to FIGS. 3 and 5, backscatter circuit 76 is described. FIG. 5 illustrates a functional block diagram of a non-limiting example of the backscatter circuit 76, and FIG. 3 illustrates an example of a non-limiting arrangement of components of the circuit. E.g., FIG. 5 illustrates that controller circuit 74 may be coupled to a communication interface function 114 (of backscatter circuit 76) and a clock generation function 116. Both the communication interface and clock generation functions 114, 116 may provide input to a packet generation function 118, and the packet generation function 118 may output message data to a baseband modulation function 120 (which modulates the message data and also exhibits bi-lateral communication with the communication interface function 114). Ultimately, the baseband modulation function 120 may output a backscatter signal to the antenna circuit 70. Each of functions 114-120 may utilize electronic hardware; in some examples, software may be used as well.

FIG. 3 illustrates that the clock generation function 116 may be embodied as a clock 122 (e.g., a 12 Mega-Hertz (MHz)) which is coupled to controller circuit 74; the clock 122 may provide a clock signal for other functions of the backscatter node 20 (further, 12 MHz is merely an example). The communication interface, packet generation, and baseband modulation functions 114, 118, 120 may be executed using a processor 124—e.g., embodied as a field-programmable gate array (e.g., FPGA 124). E.g., FPGA 124 may be configured to generate a valid packet (e.g., a BLE coded or uncoded physical layer (PHY) packet based on a BLE standard, a coded or uncoded packet according to another protocol, or the like). In at least one example, the packet data of the valid packet comprises sensor data from sensor S. Further, FPGA 124 may generate a modulated waveform (such as a frequency-shift key (FSK) modulated waveform) based on the bits of the valid packet. For example, FPGA 124 may divide an output of clock 122 into two different numbers 126, 128 such that the frequency separation satisfies the BLE standard requirements. According to one non-limiting example, number 126 is 12 (e.g., clock÷12) and number 128 is ¾ (e.g., clock÷¾). Numbers 126, 128 may be differ based on protocol implementation.

In operation, the transmitter 12, receiver 14, and node(s) 20 desirably are aligned in frequency and time. For example, transmitter 12 may emit an RF signal (e.g., an excitation signal) at a center frequency ($f_{TX}$), node(s) 20 may receive the excitation signal using an impedance matched to the transmission, node(s) 20 may determine a backscatter communication, node(s) 20 may transmit the backscatter communication using switching circuit 82 (changing to a different impedance) and transmitting at a backscatter center frequency ($f_{bs}$), and receiver 14 may receive both the RF signal and the backscatter communication (e.g., the backscatter signal) at frequency ($f_{TX} \pm f_{bs}$).

Figure 6:
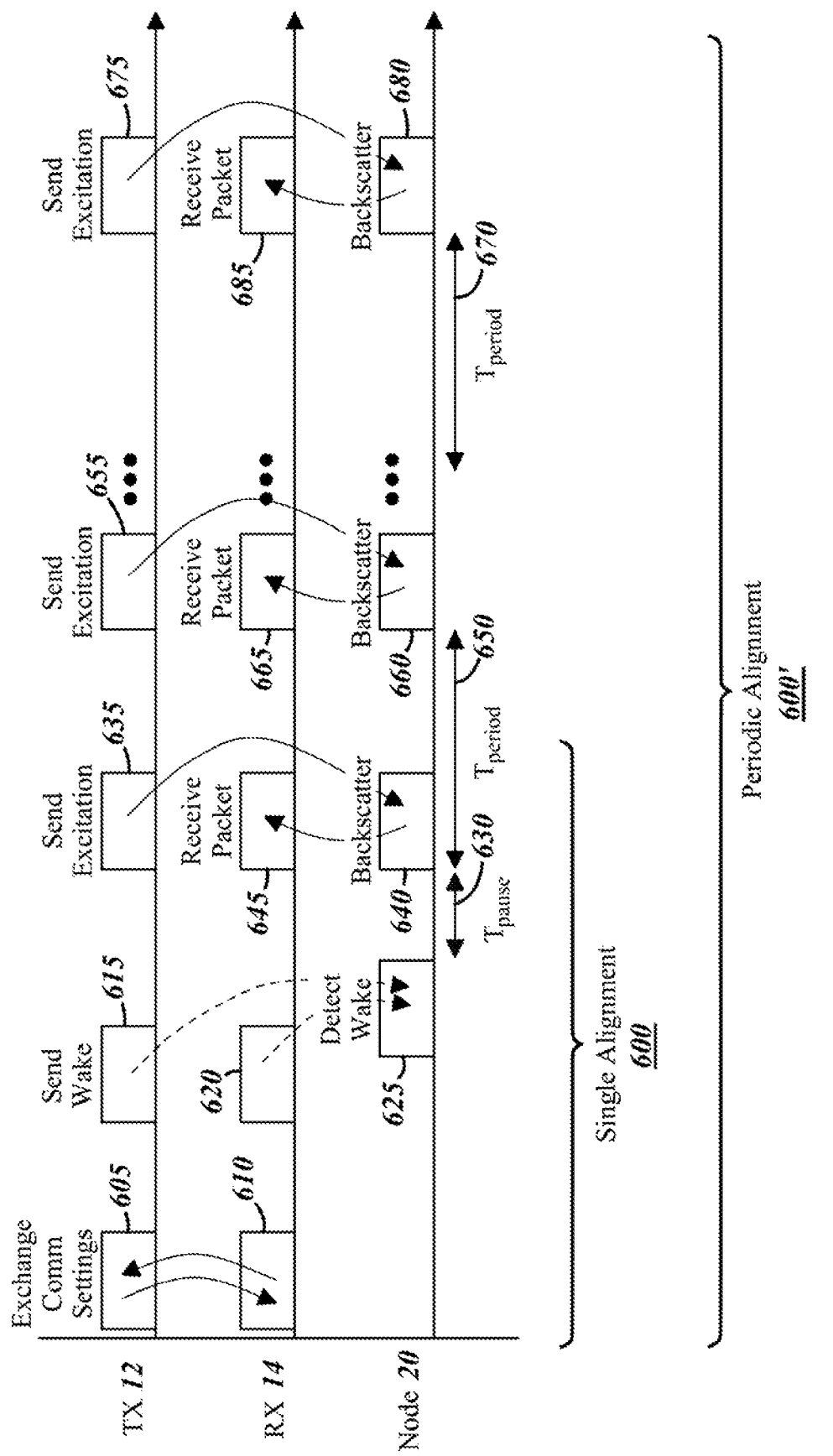
FIG. 6 illustrates a schematic diagram of wireless communication between the transmitter, the receiver, and the backscatter node.

The processes that follow may be used separately or in any combination with one another. FIG. 6 illustrates a process 600 (comprising blocks 605-645) and a process 600' (comprising blocks 605-680) and by which the node 20 may be aligned with the transmission of transmitter 12 e.g., namely, a single alignment mode and a periodic alignment mode. In process 600, to be in the single alignment mode, the transmitter 12 and receiver 14 (in blocks 605, 610) may exchange communication settings (e.g., transmitter 12 may send settings and receiver 14 may acknowledge). These settings may comprise a plurality of link parameters (e.g., also referred to herein as backscatter parameters or transmission parameters). Non-limiting examples of these link parameters include: one of a plurality of radio frequency (RF) excitation frequencies (e.g., in a BLE configuration, one of 75 excitation frequencies (e.g., also referred to as channels)) (e.g., $f_{TX}$), a corresponding RF excitation power, a corresponding modulation center frequency of the backscatter node (e.g., $f_{bs}$) (this may be a single sideband (SSB) of the excitation frequency; thus, $f_{bs}$ may be dependent upon $f_{TX}$), a wake-up source identifier (e.g., identifier indicating which of the transmitter 12 or receiver 14 is operating in the transmitting mode), a backscatter transmission delay interval, a transmitter antenna selection (e.g., an identifier indicating which of a plurality of antennas 44a, 44b is being used by transmitter 12), a receiver antenna selection (e.g., an identifier indicating which of a plurality of antennas 58a, 58b is being used by receiver 14), and a backscatter node antenna (e.g., an identifier of antenna 80). Thereafter (in blocks 615, 620), at least one of transmitter 12 or receiver 14 may provide an optional RF signal to wake up node 20—e.g., as described above, this may comprise a predefined waveform (e.g., a predetermined series comprising 0s and 1s—e.g., formatted as amplitude or frequency modulation or the like). In response, node 20 may detect the predefined waveform—e.g., regardless of whether the RF signal is relatively weak or relatively strong, as discussed above, and in response to the detection, node 20 may change from a low power mode to an active mode (e.g., using higher power) (block 625). More particularly, node 20 may pause (630) a predetermined duration ($T_{pause}$) before switching from the low power mode to the active mode. Following the duration ($T_{pause}$), (in block 635) transmitter 12 may transmit an RF signal using frequency ($f_{TX}$) to receiver 14 which— due to a proximity of node 20—wirelessly excites node 20 causing it to transmit a backscatter communication (block 640) (e.g., at frequency $f_{bs}$). In some examples, block 640 further may comprise the predefined waveform (e.g., in a header file) so that node 20 may know to send a backscatter communication (however, this additional receipt of the predefined waveform is not required). This backscatter communication (e.g., comprising packet data) from node 20 may be received by receiver 14 (block 645)—e.g., along with the RF signal from transmitter 12—e.g., thus, receiver 14 may receive $f_{TX}\pm f_{bs}$. This process of single alignment thereafter may end. Or in some examples, the process 600 may be repeated again.

In process 600', the periodic alignment mode, the transmitter 12, receiver 14, and node 20 may execute blocks 605-645 as well. Accordingly, a re-description of these blocks will not set forth below.

In process 600', a predetermined duration ($T_{period}$) (650) may follow block 645. More particularly, process 600' may include block 655 (send excitation from transmitter 12) followed by block 660 (backscatter communication from node 20) followed by block 665 (receiver 14 receives communication from node 20) followed by another duration $T_{period}$ (670)—wherein blocks 655, 660, and 665 may be similar or identical to blocks 635, 640, and 645, respectively. FIG. 6 illustrates that any suitable quantity of iterations may occur periodically (e.g., similar to blocks 655-670—e.g., including a final sequence of block 675, block 680, and block 685, wherein blocks 675-685 may be similar or identical to blocks 635-645, respectively.

Figure 7:
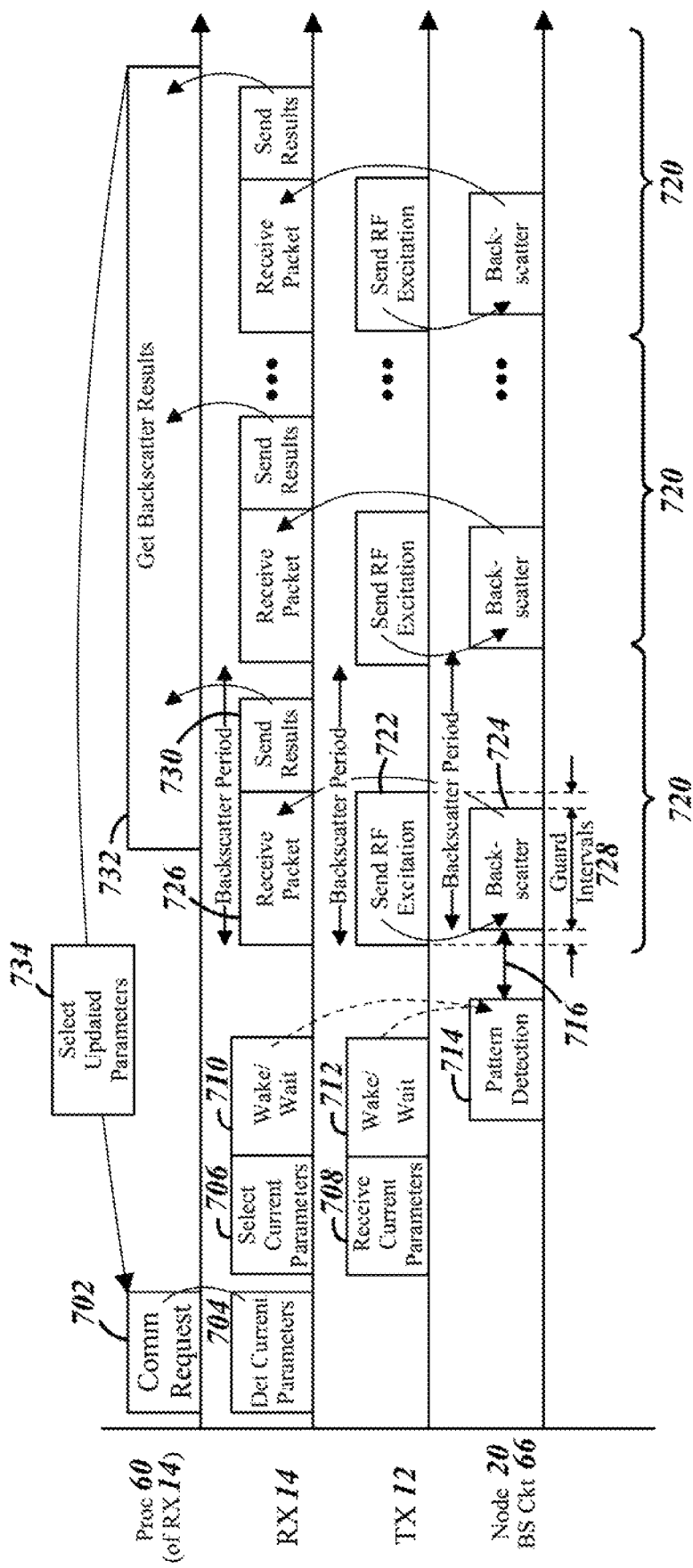
FIG. 7 illustrates another schematic diagram of wireless communication between the transmitter, the receiver, and the backscatter node-illustrating updating a set of link parameters used by the backscatter communication system.

Turning now to FIG. 7, a process 700 is illustrated providing an overview of updating a set of link parameters using a closed control loop. The process begins with processor 60 (of receiver 14) making a communication request (block 702). The request may comprise a unique identifier of node 20, a center frequency of an RF signal in the transmitting mode, an RF excitation power, a modulation center frequency to be used by node 20, an identifier of the wake-up source (e.g., that transmitter 12 may be the source (or the receiver 14 may be the source-whichever is closer to the node 20)), a selected antenna of transmitter 12 (e.g., one of 44a, 44b), a selected antenna of receiver 14 (e.g., one of 58a, 58b), and the antenna 80 of the node 20. Based on the request, processor 60 may determine a set of link parameters (block 704). Receiver 14 then may share these current link parameters with the transmitter 12 (block 706), and transmitter 12 receives these link parameters (block 708). Next, receiver 14 may enter a wake state and/or a wait state (block 710), and transmitter 12 may transmit enter a wake state and/or a wait state (block 712). [Note: e.g., when transmitter 12 sends the wake-signal, then receiver 14 is in the wait state; and vice-versa.] Upon receipt, node 20 may execute pattern detection to determine whether predefined waveform is present in a high-frequency signal—e.g., once the RF signal is extracted (as previously discussed) (block 714). Block 714 further may comprise determining a received signal strength of the high-frequency signal (e.g., a wake-up signal). FIG. 7 also illustrates that a predetermined duration ($T_{pause}$) may follow (716). It should be appreciated that a set of link parameters provided to the node 20 (by the transmitter 12 or receiver 14) may be in a wake-up message or in another message. Further, which set of link parameters to use may be communicated to the node 20 via an identifier (e.g., one of a plurality of identifiers, each of the plurality being predefined to correspond to sets of link parameters).

Following 716, successive cycles 720 may occur. Each cycle 720 may be similar or identical; therefore, only one will be explained in detail. It should be appreciated that while the steps/blocks in cycles 720 may be similar, the data transmitted by transmitter 12 and/or node 20 may vary with each cycle 720. Further, as explained more below, according to a policy execution (e.g., at receiver 14), the sets of link parameters may differ.

Cycle 720 may comprise 722-730, wherein a time duration for each cycle 720 is defined in the figure as a backscatter period. Cycle 720 may begin with block 722, wherein transmitter 12 transmits an RF signal which acts as RF excitation to node 20. Node 20 may generate a backscatter communication (e.g., a backscatter RF signal) (block 724) using the set of link parameters sent in block 712, and this backscatter communication may be received by receiver 14 (block 726). Block 726 further may comprise determining a received signal strength of the backscatter communication. FIG. 7 illustrates that the backscatter communication may utilize guard intervals on either side of the backscatter transmission (e.g., to avoid packet collisions). In block 730 which may follow, backscatter communication results may be shared with processor 60 which may evaluate those results (block 732). As will be described more below, updated sets of link parameters (block 734) may be determined by processor 60 and used in a future communication request (e.g., like block 702). A subsequent cycle 720 may begin following block 730—e.g., after the backscatter period. As discussed below, one or more of the link parameters may differ in the updated set of link parameters than those previously used by the transmitter 12.

FIG. 8 is a flow diagram illustrating a process 800 (which may be executable by processor 60 of receiver 14) using a smart policy (block 810) and an exploration policy (block 820). The smart policy (block 810) may select one or multiple sets of link parameters with a relatively high chance of successful backscatter communication by analyzing a backscatter communication history and results (successful or not successful)—e.g., with respect to use of the sets of link parameters. A cross entropy approach may be determined by processor 60, wherein a probability of success is stored for each set of link parameters. Probabilities may be updated after each communication attempt using Equation (1).

$$Prob_{next} = Prob_{previous}*k + comm_{score}*(1-k), \quad \text{Equation (1).}$$

wherein $Prob_{next}$ refers to one of a first probability of (next) successful communication using a (next set of link parameters) and based on a second probability of (previous) successful communication, k refers to a predetermined smoothing factor, $Prob_{previous}$ refers to the second probability of (previous) successful communication which used a previous set of link parameters (which were different than the next set of link parameters), and $comm_{score}$ refers to a communication score of a previous communication.

Numerous probability values may be determined—e.g., corresponding to numerous sets of link parameters. According to a non-limiting example, hundreds of set of links parameters could be used in system 10. For example, continuing with the example above, 600 sets of link parameters could be used—e.g., wherein one of seventy-five (75) different excitation frequencies may be used for the RF signal (e.g., $f_{TX}$), one RF excitation power value may be used, one modulation center frequency of the backscatter node (e.g., $f_{bs}$) may be used, one of two wake-up source identifiers that may be used, one of two different transmitter antennas 44a, 44b may be used, one of two different receiver antennas 58a, 58b may be used, and one backscatter node antenna may be used. E.g., 600=75*1*1*2*2*2*1.

The exploration policy (block 820) may determine one or multiple set of link parameters that might have a high chance of successful communication while some randomness is used in the selection process. This is discussed more below in process 900.

According to process 800, processor 60 selects a policy to execute (block 830)—e.g., either smart policy 810 or exploration policy 820—influenced by a confidence prediction (block 850), wherein the confidence prediction is based on successful communications of node 20. The selection of block 830 may select a next set of link parameters—e.g., for a subsequent backscatter communication. This selection process may iterate after each packet, or after each N packets (e.g., wherein N is a predetermined quantity), after each T seconds (e.g., wherein T is a predetermined quantity), or when the performance indicators (e.g., a success rate factor, as discussed below) pass a predetermined threshold TH.

Based on the selected policy, the processor 60 selects a set of link parameters (e.g., such as those selected in block 734 in process 700) and transmitter 12, receiver 14, and node 20 use those link parameters in their instant environment (block 840). It should be appreciated that in short-range wireless communication implementations, slight changes in the surroundings may affect backscatter communication success and/or quality. For example, considering the kitchen implementation shown in FIG. 1, if a nearby window or door (not shown) were to be opened, the RF signal sent by transmitter 12 may be weaker upon arrival at node 20, signal quality of backscatter communication from node 20 may be weaker upon arrival at receiver 14, etc. In other examples, the RF signal received at node 20 may become stronger. Other factors may affect the environment-non-limiting examples include: persons moving within a room/vicinity of the transmitter 12, receiver 14, and/or nodes 20, RF interference from other devices, appliance doors opening or closing, room doors opening or closing, etc. Processor 60 may evaluate results of the communication (e.g., including backscatter communication success or failure, as discussed below) and thereafter determine the confidence prediction (block 850). Block 850 may comprise estimating a probability of success for a subsequent backscatter communication based on the history of selected sets of link parameters and results (successful or unsuccessful). Thereafter, the process 800 may repeat. As shown in FIG. 8, looping back to the exploration policy (block 820) may be optional.

FIG. 9 illustrates an embodiment of the process 800 shown in FIG. 8, wherein block 970 is an embodiment of block 830, wherein block 960 is an embodiment of block 820, wherein blocks 910-950 are an embodiment of block 810, wherein block 990 is an embodiment of block 850, and wherein block 980 is an embodiment of block 840. Thus, FIG. 9 illustrates a flow diagram illustrating a process 900 of updating the set of link parameters using the smart policy and the exploration policy. Process 900 may optimize the link parameters used in backscatter communication—i.e., determine link parameters having a highest success probability. Additionally, process 900 may have a low response time. Process 900 may be repeated—as the operating environment of system 10 may change, as discussed above. Process 900 may be executed using multiple nodes 20; however, as each node 20 may behave similarly, only one node 20 will be described.

Process 900 may begin with block 910—after transmitter 12 sends an RF signal to the nodes 20 and the nodes provide respective backscatter communications to receiver 14. In block 910, processor 60 (of receiver 14) may evaluate a backscatter score for a backscatter communication using Equation (2). The backscatter score may prevent high interference channels by assigning a score of zero (0) to failed communications, and channels with a higher margin from link sensitivities will receive a higher score based on both wake-up and backscatter communications.

$$\text{backscatter score}(score_{bs}) = \begin{cases} \sqrt{rss_{wake} * rss_{bs}}, & \text{if packet is received} \\ 0, & \text{otherwise} \end{cases} \quad \text{Equation (2)}$$

wherein $rss_{wake}$ may be a received signal strength at node 20 (e.g., block 714, described above), wherein $rss_{bs}$ may be a received signal strength at the receiver 14 of the backscatter communication minus sensitivity (e.g., block 726, described above).

Other examples of Equation (2) also exist. For example, $rss_{wake}$ could be a received signal strength of a transmitted packet received at node 20 instead of a signal strength of a wake-up signal.

As discussed above, a relatively large quantity of sets of link parameters may be used (e.g., i=600 different sets in one example), and these sets may be stored in memory 62. Block 920 may follow, wherein a vector score (Si) [for all i] may be calculated based on the previous backscatter communication event (based on $S_{prev}$), as shown in Equation (3).

$$S_{(i)} = S_{prev}*\alpha + score_{bs}*(1-\alpha), \quad \text{Equation (3).}$$

wherein α is a smoothing factor.

For $score_{bs}$, the value of Equation (2) may be used. Smoothing factor (α) may be a predetermined constant—e.g., that may require 20-30 packets to be dropped to cut a score by 50% (e.g., if α=0.97), or e.g., that may require only 2 packets to be dropped to cut a score by 50% (e.g., if α=0.70). According to at least one example, two smoothing factors may be used, as shown in block 930—e.g., a plurality of combinations 930*a* of sets of link parameters (e.g., 600 combinations) using a first alpha and a different plurality of combinations 930*b* of sets of link parameters (e.g., 600 different combinations) using a second alpha (again, quantities of 600 is merely an example; other quantities may be used instead).

Using Equation (2) and a larger smoothing factor may be better suited to temporary channel variations (e.g., such as when an individual enters and leaves a room), whereas using Equation (2) with a smaller smoothing factor may be better suited to longer-term channel variations (e.g., such as when the individual enters the room and sits down).

In block 940, processor 60 may select one of the sets of link parameters based on which of the sets has a highest score. For example, processor 60 may determine a set of link parameters from the pluralities 930*a*, 930*b* which comprises a highest vector score.

In optional block 950, processor 60 may validate the set of link parameters (e.g., a first option; selected in block 940) for compatibility with government-regulated guidelines— e.g., whether maximum power output is within frequency-hopping guidelines. One non-limiting example are Federal Communications Commission (FCC) guidelines. If the selected set of link parameters fails (e.g., if SM fails), then the process 900 may loop back to block 940 and processor 60 may select another set of link parameters (e.g., a second option) having a next highest score (e.g., from among the pluralities 930*a*, 930*b*). An approved set of link parameters suitable per government regulations is passed onto/evaluated by block 970, as discussed below.

In block 960, processor 60 may select randomly a set of link parameters from a plurality of sets of link parameters previously determined to be suitable and stored in memory 62. According to one example, this may be a set of link parameters from among the pluralities 930*a*, 930*b*; however, this is not required. It should be appreciated that the randomly-selected set of link parameters may improve a computational efficiency of optimizing performance of system 10—e.g., as an iteration of only a set of link parameters of pluralities 930*a*, 930*b* may be more time-intensive in some examples. The randomly selected set of link parameters is passed onto/evaluated by block 970 as well.

In block 970, the exploration policy or the smart policy is executed by processor 60, wherein processor 60 selects one of the two sets of link parameters—e.g., either the set provided via block 950 or the set provided via block 960. This selection is influenced by a success rate factor and a probability X, which is calculated in block 990 and described below. When the probability X is above a threshold (e.g., >50%), then processor 60 may select the set of link parameters of block 950, and if the probability X is less than a threshold (e.g., <50%), then processor 60 may select the set of link parameters of block 960.

In block 980, processor 60 uses the set of link parameters selected in block 970 in the backscatter communication. An example is set forth in FIG. 7.

In block 990, processor 60 may calculate and/or update a success rate factor, use the success to determine a probability value (X), and provide this probability value (X) to block 970. Equations (4) and (5) are examples of techniques for determining success rate and X.

$$\text{Success rate} = (1-a)*(1-b)*(1-c), \quad \text{Equation (4)}.$$

wherein $\alpha$ is a packet error rate between the transmitter 12 and receiver 14, wherein b is a packet error rate of the node 20 waking up in response to the wake-up signal (e.g., which includes the predefined waveform), and wherein c is a packet error rate of the backscatter communication between node 20 and receiver 14.

$$X = 1 - \tanh(3*\text{success rate})/\tanh(3). \quad \text{Equation (5)}.$$

Following block 990, the process 900 may repeat (e.g., loop back to block 910).

Above, process 900 was executed by receiver 14. In other embodiments and as discussed above, process 900 could be executed by transmitter 12 instead (e.g., via processor 46 instead of processor 60)—and using memory 48 instead of memory 62.

Other embodiments are possible. For example, a channel arbitration implementation between backscatter nodes 20 can be used by allowing backscatter nodes to explicitly select the backscatter frequency channel (e.g., a selectable backscatter channel mode). The channel can be decided during device initialization phase by a corresponding transmitter 12 or receiver 14. The channel can also be selected explicitly by the user by pressing a button on the backscatter tag. In this case block 122 in FIG. 3 will include appropriate clocks (e.g. 12 MHz for 3.5 MHz center frequency shift; 20 MHz for 4.5 MHz center frequency shift) or programmable clock. Additionally, the channel can also be fixed using hardware design (in this case different backscatter nodes 20 reflect on different channels). In such a network architecture, explicit wakeup signal is not required from the transmitter 12 or receiver 14 (as discussed above) to wake-up the respective backscatter node 20. All backscatter nodes 20 may transmit simultaneously and corresponding receiver 14 may receive by selecting the appropriate reception channel depending on which backscatter node they want to listen. While this example is energy inefficient (e.g., having a single receiver 14), the solution is more efficient when there are multiple backscatter-receiver pairs in the system as single transmitter (e.g., such as transmitter 12) can potentially be used to generate the excitation signal. In this case, wake-up circuit 72 (FIG. 3) is not needed on the backscatter tag. Also, in the communication cycle Wakeup procedure is then not required which include blocks 615, 620, 625 (shown in FIG. 6) and block 710, 712, 714 (shown in FIG. 7).

Other embodiments are possible. For example, a channel arbitration implementation between backscatter nodes 20 can be used by allowing backscatter nodes to transmit the backscattered packet at pre-determined delay after receiving the excitation signal. The respective delay for each node 20 can be decided during device initialization phase by a corresponding transmitter (12 or receiver 14. The delay can also be selected explicitly by the user by pressing a button on the backscatter node 20. In such a network architecture, explicit wake-up signal is not required from the transmitter 12 or receiver 14 to wake-up the backscatter node 20. All backscatter node(s) 20 transmit at their pre-determined time delays after receiving the excitation signal. In this case, wake-up circuit 72 (FIG. 3) is not needed on the backscatter node 20. Also, in the communication cycle wake-up procedure is then not required which include blocks 615, 620, 625 (shown in FIG. 6) and block 710, 712, 714 (shown in FIG. 7).

Other embodiments are possible. For example, the wake-up circuit 72 in FIG. 3 may only comprise envelope detection circuit 90 without pattern correlator 92 and decoder 94. In such a system, a backscatter node only may wake up when it is in a desired proximity of a respective wake-up source (such as transmitter 12 or receiver 14). In such case, channel arbitration will be as described immediately above (e.g., according to the exemplary channel arbitration implementation). The communication cycle presented in FIG. 6 may remain unaffected. In FIG. 7, pattern detection 714 will include only wake-up detection.

Figure 10:
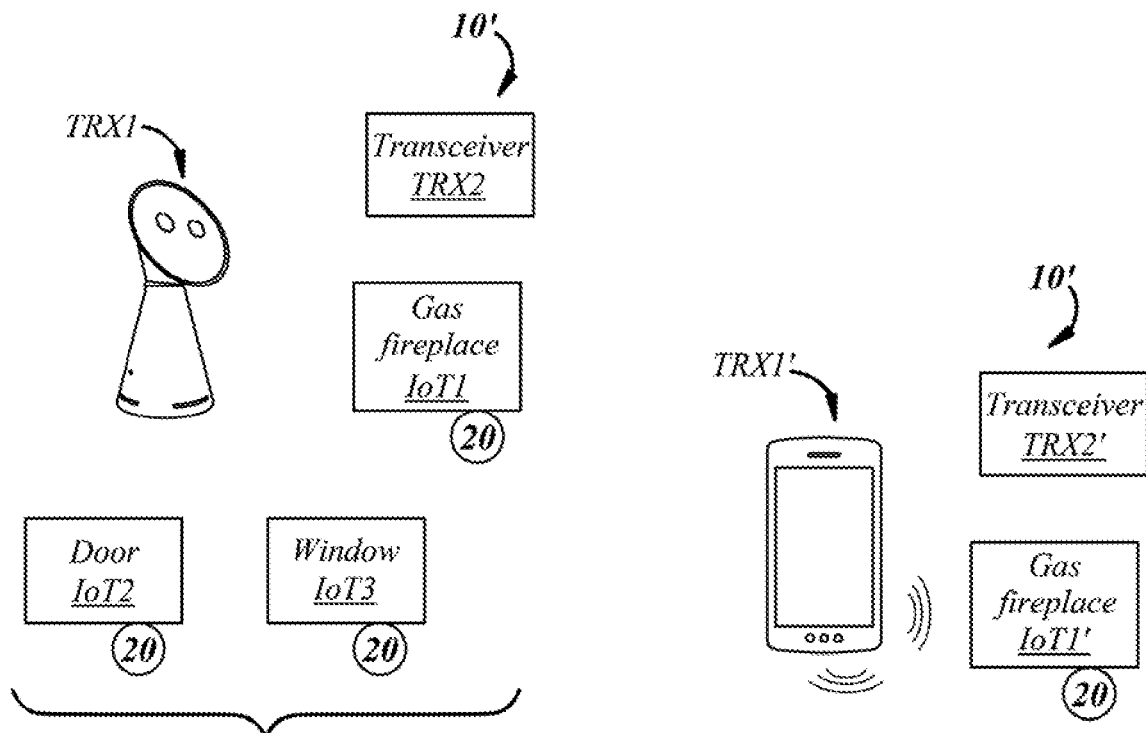
FIG. 10 is a schematic diagram illustrating another example environment of the backscatter communication system.
Figure 11:
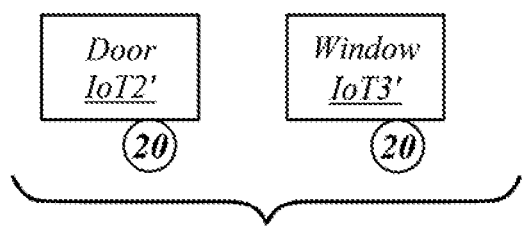
FIG. 11 is a schematic diagram illustrating another example environment of the backscatter communication system.
Figure 12:
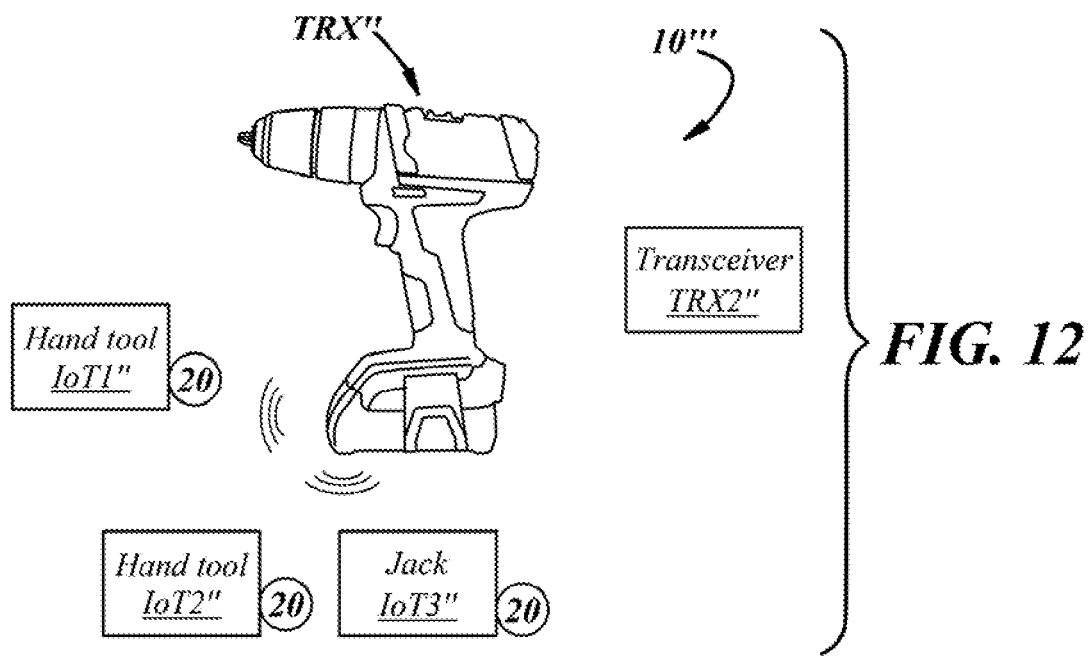
FIG. 12 is a schematic diagram illustrating another example environment of the backscatter communication system.

Any of the above-cited processes may be used with other embodiments of system 10 as well. FIGS. 10-12 illustrate a few additional non-limiting examples.

FIG. 10 illustrates a backscatter communication system 10' that may comprise a digital countertop robot that comprises TRX1 (e.g., which may interact with a user in a residential, commercial, or industrial environment), a transceiver TRX2 (e.g., located on another device (not shown)), and a plurality of Internet of Things (IoT) devices (e.g., a gas fireplace IoT1, a door IoT2, and a window IoT3) which each comprise a backscatter node 20. As discussed above, robot TRX1 and transceiver TRX2 may be a transmitter, a receiver, or a combination thereof. System 10' may interact with the nodes 20 of IoT devices IoT1, IoT2, IoT3 according to any embodiment described above with respect to system 10. System 10' may facilitate a connected home or workspace.

FIG. 11 illustrates a backscatter communication system 10" that may comprise a mobile device that comprises TRX1' (e.g., which may interact with a user in a residential, commercial, or industrial environment), a transceiver TRX2'; (e.g., located on another device (not shown)), and a plurality of Internet of Things (IoT) devices (e.g., a gas fireplace IoT1', a door IoT2', and a window IoT3') which each comprise a backscatter node 20. As discussed above, mobile device TRX1' and transceiver TRX2' may be a transmitter, a receiver, or a combination thereof. System 10" may interact with the nodes 20 of IoT devices IoT1', IoT2', IoT3' according to any embodiment described above with respect to system 10. System 10" may facilitate a connected home or workspace.

FIG. 12 illustrates a backscatter communication system 10''' that may comprise a power tool that comprises TRX1" (e.g., which may interact with a user in a residential, commercial, or industrial environment), a transceiver TRX2"; (e.g., located on another device (not shown)), and a plurality of Internet of Things (IoT) devices (e.g., a hand tool IoT1", a hand tool IoT2", and a hand tool IoT3") which each comprise a backscatter node 20. As discussed above, power tool TRX1" and transceiver TRX2" may be a transmitter, a receiver, or a combination thereof. System 10''' may interact with the nodes 20 of IoT devices IoT1", IoT2", IoT3" according to any embodiment described above with respect to system 10. System 10''' may facilitate a connected home or workspace.

Thus, there has been described a backscatter communication system comprising a transmitter, a receiver, and one or more backscatter nodes. According to one embodiment, the system may be configured to use a smart policy, an exploration policy, or both, wherein the policy(ies) determine a set of link parameters to be used in backscatter communication. According to another embodiment, the system may comprise a backscatter node that comprises an envelope detection circuit that is insensitive to whether a received RF signal is weak or strong. According to another embodiment, the backscatter node may be configured to detect a predefined waveform within an RF signal sent by the transmitter, and in response to the detection, the backscatter node may switch from a low power mode to an active mode. Any of these embodiments may be used in combination with one another.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A backscatter communication system, comprising:
  a backscatter node, comprising:
   an antenna circuit; and
   a wake-up circuit coupled to the antenna circuit, the wake-up circuit comprising:
    an envelope detection circuit coupled to the antenna circuit that receives a radio frequency (RF) signal from a transmitter;
    a pattern correlation circuit coupled to the envelope detection circuit; and
    a receiver circuit coupled to the pattern correlation circuit and configured to receive message data from the RF signal,
   wherein the pattern correlation circuit is configured to identify at least one predefined waveform within the RF signal and in response to the identification, enable the receiver circuit, wherein the envelope detection circuit comprises a rectifier coupled to a low pass filter (LPF) via a node, wherein the LPF comprises a capacitor and a nonlinear resistor.

2. The system of claim 1, wherein the nonlinear resistor comprises a first resistor coupled between the node and ground, a first diode-resistor pair coupled between the node and ground, and a second diode-resistor pair coupled between the node and ground.

3. The system of claim 2, wherein the backscatter node further comprises a controller circuit coupled to the wake-up circuit and a backscatter circuit coupled to the controller circuit, wherein the controller circuit is configured to enable the backscatter circuit when the pattern correlation circuit identifies the at least one predefined waveform.

4. The system of claim 3, wherein enabling the backscatter circuit further comprises switching from a low power mode to an active mode.

5. The system of claim 1, further comprising a receiver and the transmitter, wherein, the backscatter node is configured to provide a backscatter signal to the receiver in response to receiving the RF signal from the transmitter.

6. The system of claim 1, further comprising a backscatter circuit coupled to the antenna circuit, wherein the backscatter circuit is configured to operate in a selectable backscatter channel mode.

7. The system of claim 6, further comprising a controller circuit coupled to the envelope detection circuit and the backscatter circuit, wherein the controller circuit comprises: at least one processor and memory that stores one or more instructions executable by the at least one processor, wherein the one or more instructions comprise to: receive from the transmitter a message indicating a backscatter channel to be used by the backscatter node.

8. A method, comprising:
receiving, at a backscatter node, a radio frequency (RF) signal that comprises a wake-up message from a transmitter or a receiver; and
in response to receiving the wake-up message, changing from a low power mode to an active mode, wherein the wake-up message comprises a predefined waveform, wherein the envelope detection circuit comprises a low pass filter that is insensitive to whether the RF signal is relatively weak or relatively strong.

9. The method of claim 8, further comprising: receiving the wake-up message via an antenna circuit of the backscatter node; and extracting the wake-up message from the RF signal via an envelope detection circuit which is coupled to the antenna circuit.

10. The method of claim 9, wherein the wake-up message is extracted when a signal strength of the RF signal is greater than a first predetermined threshold, when the signal strength of the RF signal less than a second predetermined threshold, or both.

11. The method of claim 8, wherein the low pass filter comprises a capacitor coupled to a nonlinear resistor.

12. The method of claim 11, wherein the nonlinear resistor comprises a first resistor coupled between a node and ground, a first diode-resistor pair coupled between the node and ground, and a second diode-resistor pair coupled between the node and ground, wherein the capacitor also is coupled between the node and ground.

13. The method of claim 8, further comprising: receiving, from the transmitter or the receiver, a set of link parameters for use in backscatter communication.

14. The method of claim 8, further comprising: using a set of link parameters and power scavenged from the RF signal, sending a backscatter communication to the receiver.

15. The method of claim 8, further comprising: after sending a backscatter communication using a set of link parameters, receiving from the transmitter an updated set of link parameters; and using the updated set of link parameters, sending another backscatter communication.

16. The method of claim 14, further comprising: receiving data from a sensor coupled to an apparatus and the backscatter node, wherein the backscatter communication comprises at least a portion of the data received from the sensor.

17. The method of claim 8, further comprising: receiving from the transmitter or the receiver an indication of a backscatter channel; and using the RF signal of the transmitter, sending a backscatter communication to the receiver via the backscatter channel.

18. A non-transitory computer-readable medium, comprising a plurality of instructions stored thereon, the plurality of instructions comprising to:
receive, at a backscatter node, a radio frequency (RF) signal that comprises a wake-up message from a transmitter or a receiver; and
in response to receiving the wake-up message, change from a low power mode to an active mode, wherein the wake-up message comprises a predefined waveform, wherein the low pass filter comprises a capacitor coupled to a nonlinear resistor.

* * * * *